(12) United States Patent
Pobloth et al.

(10) Patent No.: US 10,915,569 B2
(45) Date of Patent: Feb. 9, 2021

(54) ASSOCIATING METADATA WITH A MULTIMEDIA FILE

(71) Applicant: Telefonaktiebolaget LM Ericsson (publ), Stockholm (SE)

(72) Inventors: Harald Pobloth, Täby (SE); Volodya Grancharov, Solna (SE); Erlendur Karlsson, Uppsala (SE); Sigurdur Sverrisson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 287 days.

(21) Appl. No.: 16/070,186

(22) PCT Filed: Mar. 15, 2016

(86) PCT No.: PCT/EP2016/055505
§ 371 (c)(1),
(2) Date: Jul. 13, 2018

(87) PCT Pub. No.: WO2017/157419
PCT Pub. Date: Sep. 21, 2017

(65) Prior Publication Data
US 2019/0034428 A1 Jan. 31, 2019

(51) Int. Cl.
*G06F 16/48* (2019.01)
*G06F 16/41* (2019.01)
*G06F 40/279* (2020.01)
*G10L 15/26* (2006.01)
*G06F 16/35* (2019.01)

(52) U.S. Cl.
CPC .............. *G06F 16/48* (2019.01); *G06F 16/35* (2019.01); *G06F 16/41* (2019.01); *G06F 40/279* (2020.01); *G10L 15/26* (2013.01)

(58) Field of Classification Search
CPC ...... G07F 17/3225; G06F 16/68; G06F 16/48; G06F 3/0484; G06F 3/04842;
(Continued)

(56) References Cited

U.S. PATENT DOCUMENTS 7,764,311 B2 * 7/2010 Bill .................. G06F 16/68
348/222.1
7,921,369 B2 * 4/2011 Bill .................. H04L 67/306
715/753

(Continued)

OTHER PUBLICATIONS

International Search Report and Written Opinion dated Dec. 20, 2016 for International Application No. PCT/EP2016/055505 filed on Mar. 15, 2016, consisting of 9-pages.
(Continued)

*Primary Examiner* — Angelica Ruiz
(74) *Attorney, Agent, or Firm* — Sage Patent Group (57) ABSTRACT

There are provided mechanisms for associating metadata with a multimedia file. The method is performed by a mood detector. A method includes detecting presence of a mood indicator in the multimedia file by a mood detection module analysing the multimedia file. The method includes determining a mood descriptive value by a mood classification module analysing a segment of the multimedia file, wherein the segment is defined by the mood indicator. The method further includes associating the mood descriptive value with the multimedia file as metadata. Detecting presence of the mood indicator by the mood detection module acts as a trigger to determine the mood descriptive value by the mood classification module.

21 Claims, 7 Drawing Sheets

(58) Field of Classification Search
CPC ...... G06F 16/44; G06F 16/636; G06F 16/683; G06F 21/32; G06F 3/005; G06F 3/017
USPC .......... 707/600–831, 899, 999.001–999.206
See application file for complete search history.

(56) References Cited

U.S. PATENT DOCUMENTS

| | | | | |
|---|---|---|---|---|
| 9,262,688 | B1* | 2/2016 | Zadeh | G05B 13/0275 |
| 9,424,533 | B1* | 8/2016 | Zadeh | G06K 9/4609 |
| 2003/0093790 | A1* | 5/2003 | Logan | G06F 16/739 |
| | | | | 725/38 |
| 2014/0095150 | A1 | 4/2014 | Berjikly et al. | |
| 2014/0181668 | A1 | 6/2014 | Kritt et al. | |
| 2015/0193889 | A1* | 7/2015 | Garg | G06Q 30/0251 |
| | | | | 705/14.49 |
| 2015/0318020 | A1* | 11/2015 | Pribula | H04N 9/8205 |
| | | | | 386/227 |
| 2015/0332118 | A1* | 11/2015 | Wang | G06K 9/00684 |
| | | | | 382/203 |

OTHER PUBLICATIONS

Min Xu et al. "Hierarchical Movie Affective Content Analysis Based on Arousal and Valence Features;" Vancouver, British Columbia, Canada; Oct. 26-31, 2008, consisting of 4-pages.

Mohammad Soleymani "Implicit and Automated Emotional Tagging of Videos;" These No. 4368; Universite de Geneve 2011, consisting of 146-pp.

Ali Houjeij et al. "A Novel Approach for Emotion Classification based on Fusion of Text and Speech;" 19th International Conference on Telecommunications (ICT 2012); 2012, consisting of 6-pages.

Alexander Osherenko et al. "Affect Sensing in Speech: Studying Fusion of Linguistic and Acoustic Features," University of Augsburg, Germany, 2009, consisting of 6-pages.

Florian B. Ookorny et al. "Detection of Negative Emotions in Speech Signals Using Bags-of-Audio-Words," 2015 International Conference on Affective Computing and Intelligent Interaction (ACII); 2015, consisting of 6-pages.

Mahesh Bargaje "Emotion Recognition and Emotion Based Classification of Audio using Genetic Algorithm—An Optimized Approach;" 2015 International Conference on Industrial Instrumentation and Control (ICIC); College of Engineering, Pune, India, May 28-30, 2015, consisting of 6-pages.

Trung-Thanh Dang et al. "Machine Learining Approaches for Mood Classification of Songs toward Music Search Engine," 2009 International Conference of Knowledge and Systems Engineering, 2009, consisting of 6-pages.

Seungwon Oh et al. "Music Mood Classification using Intro and Refrain Parts of Lyrics;" 2013 International Conference on Information Science and Applications (ICISA); Jun. 24-26, 2013, consisting of 3-pages.

* cited by examiner

Fig. 8

ASSOCIATING METADATA WITH A MULTIMEDIA FILE

CROSS-REFERENCE TO RELATED APPLICATIONS

This application is a Submission Under 35 U.S.C. § 371 for U.S. National Stage Patent Application of International Application Number: PCT/EP2016/055505, filed Mar. 15, 2016 entitled "ASSOCIATING METADATA WITH A MULTIMEDIA FILE," the entirety of which is incorporated herein by reference.

TECHNICAL FIELD

Embodiments presented herein relate to a method, a mood detector, a computer program, and a computer program product for associating metadata with a multimedia file.

BACKGROUND

It is known to create metadata for audio-visual media content. Such metadata can be used to make the media content easily accessible by means of search or recommendations but can also be used to associate content to other content or even to select advertisements that connects to the media content and its potential audience. One category of metadata is "mood" which can describe a scene of audio-visual media content (such as a movie scene) and/or the persons in that scene with mood attributes such as "happy", "sad", "humorous", "feel good", "sentimental", "controversial", "cynical", etc.

To create metadata comprising a description of the mood of a scene or person traditionally requires a human being to observe the media content and manually tag the metadata to the audio-visual media content. Due to the laborious effort required, the tagging is commonly not performed per scene but per content. This leads to a very coarse tagging. To overcome the high manual labor and coarse tagging, automatic metadata creation is an ongoing trend. Tagging metadata related to mood is regarded as a complex multi-modal process. Cues like timbre, body language, knowledge of a person's character, what is said, and so on, could be used during tagging of metadata related to mood. Currently automatic mechanisms for tagging metadata commonly consider only a subset of those cues.

To use a subset of the cues that humans use to detect mood or emotion leads to less than optimal results since the subset leaves ambiguities in the mood detection. On the other hand, using continuous multi-modal mood detection increases the complexity of the detection significantly, which prohibits the use of such mechanisms in a number of practical applications. Existing mechanisms do either focus on one modality to derive the mood decision or continuously monitor all the modalities considered. Thus, the complexity of the mechanisms increases significantly when more than one modality is used.

Hence, there is still a need for improved mechanisms for associating metadata with a multimedia file.

SUMMARY

An object of embodiments herein is to provide efficient mechanisms for associating metadata with a multimedia file.

According to a first aspect there is presented a method for associating to metadata with a multimedia file. The method is performed by a mood detector. The method comprises detecting presence of a mood indicator in the multimedia file by a mood detection module analysing the multimedia file. The method comprises determining a mood descriptive value by a mood classification module analysing a segment of the multimedia file, wherein the segment is defined by the mood indicator. The method comprises associating the mood descriptive value with the multimedia file as metadata. Detecting presence of the mood indicator by the mood detection module acts as a trigger to determine the mood descriptive value by the mood classification module.

Advantageously this is an efficient method for associating metadata with a multimedia file.

Advantageously, since the mood detection module acts as a trigger for the mood classification module, this avoids heavy computations to be spent where no strong emotion or mood information can be expected.

Advantageously this method enables computational effort to be saved during detection of the presence of the mood indicators and to focus the computational effort to be spent during time segments where a high likelihood of mood expression is expected (as defined by the detected mood indicators).

Advantageously, this method is computationally efficient whilst still providing mood detection.

According to a second aspect there is presented a mood detector for associating metadata with a multimedia file. The mood detector comprises processing circuitry. The processing circuitry is configured to cause the mood detector to detect presence of a mood indicator in the multimedia file by a mood detection module analysing the multimedia file. The processing circuitry is configured to cause the mood detector to determine a mood descriptive value by a mood classification module analysing a segment of the multimedia file, wherein the segment is defined by the mood indicator. The processing circuitry is configured to cause the mood detector to associate the mood descriptive value with the multimedia file as metadata. Detecting presence of the mood indicator by the mood detection module acts as a trigger to determine the mood descriptive value by the mood classification module.

According to a third aspect there is presented a mood detector for associating metadata with a multimedia file. The mood detector comprises processing circuitry and a computer program product. The computer program product stores instructions that, when executed by the processing circuitry, causes the mood detector to perform operations, or steps. The operations, or steps, cause the mood detector to detect presence of a mood indicator in the multimedia file by a mood detection module analysing the multimedia file. The operations, or steps, cause the mood detector to determine a mood descriptive value by a mood classification module analysing a segment of the multimedia file, wherein the segment is defined by the mood indicator. The operations, or steps, cause the mood detector to associate the mood descriptive value with the multimedia file as metadata. Detecting presence of the mood indicator by the mood detection module acts as a trigger to determine the mood descriptive value by the mood classification module.

According to a fourth aspect there is presented a mood detector for associating metadata with a multimedia file. The mood detector comprises a detect module configured to detect presence of a mood indicator in the multimedia file by having a mood detection module analysing the multimedia file. The mood detector comprises a determine module configured to determine a mood descriptive value by having a mood classification module analysing a segment of the multimedia file, wherein the segment is defined by the mood indicator. The mood detector comprises an associate module configured to associate the mood descriptive value with the multimedia file as metadata. Detecting presence of the mood indicator by the mood detection module acts as a trigger to determine the mood descriptive value by the mood classification module.

According to a fifth aspect there is presented a computer program for associating metadata with a multimedia file, the computer program comprising computer program code which, when run on a mood detector, causes the mood detector to perform a method according to the first aspect.

According to a sixth aspect there is presented a computer program product comprising a computer program according to the fifth aspect and a computer readable storage medium on which the computer program is stored.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
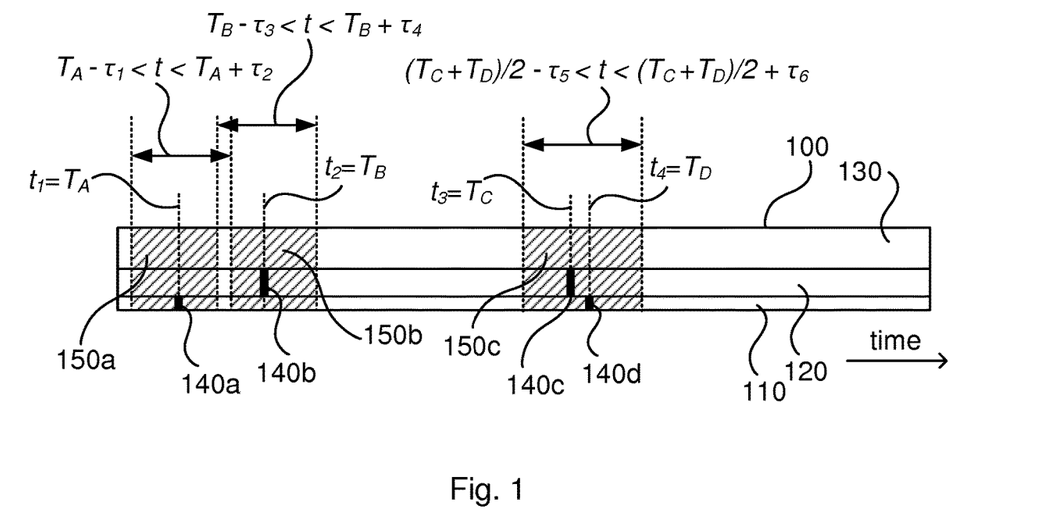
FIG. 1 is a schematic diagram illustrating a multimedia file according to an embodiment.

FIG. 1 is a schematic diagram illustrating a multimedia file 100 according to an embodiment. According to the illustrative example of FIG. 1 the multimedia file 100 comprises a text part 110, an audio part 120, and a video part 130. However, generally, the multimedia file 100 comprises at least one of the text part 110, the audio part 120, and the video part 130.

Mood indicators 140a, 140b, 140c, 140d are present at times $t_1=T_A$, $t_2=T_B$, $t_3=T_B$, and $t_4=T_D$, respectively, in the multimedia file 100. According to the illustrative example of FIG. 1 the mood indicators 140a, 140d are associated with the text part 110 of the multimedia file 100 and the mood indicators 140b, 140c are associated with the audio part 120 of the multimedia file 100. Examples of mood indicators 140a, 140b, 140c, 140d will be provided below. The mood indicators 140a, 140b, 140c, 140d define segments 150a, 150b, 150c. According to the illustrative example of FIG. 1 each mood indicator 140a, 140b defines its own segment 150a, 150b and mood indicator 140c, 140d define a common segment 150c. Each segment 150a, 150b, 150c has a length, corresponding to a duration in time. In this respect, each segment 150a, 150b, 150c can have its own length. Examples of how the segments 150a, 150b, 150c can be used will be provided below.

Figure 2:
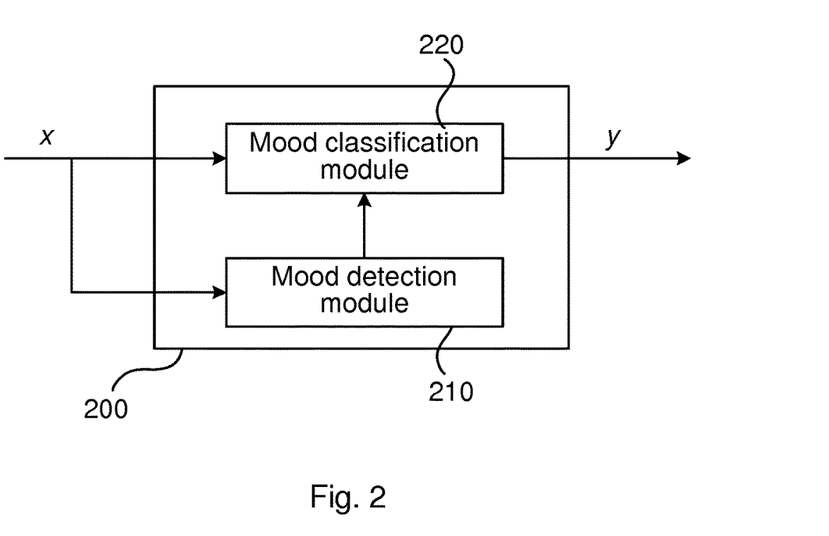
FIGS. 2, 3, 4, 5, and 6 are schematic diagrams illustrating a mood detector according to embodiments.

FIG. 2 is a schematic diagram illustrating a mood detector 200 according to an embodiment. The mood detector 200 is configured to associate metadata y with a multimedia file x. The multimedia file x could be the multimedia file 100, and hence the terms multimedia file x and multimedia file 100 will be used interchangeably. The mood detector 200 comprises a mood detection module 210 and a mood classification module 220. In general terms the mood detection module 210 is configured to detect a mood indicator 140a, 140b, 140c, 140d in the multimedia file x, 100, and the mood classification module 220 is configured to determine a mood descriptive value and to associate the mood descriptive value with the multimedia file as metadata y. In general terms, the mood detector 200 implements functionality to analyze one or several modalities (i.e., text, audio, or video) of the content of the multimedia file x, 100 to derive features, corresponding to the mood indicators 140a, 140b, 140c, and eventually detect or classify what mood the content represents by analyzing the segments 150a, 150b, 150c defined by the mood indicators 140a, 140b, 140c. Further details of the operations performed by the mood detector 200 to associate metadata y with the multimedia file x, 100 will be disclosed below with reference to the flowcharts of FIGS. 7 and 8.

FIGS. 3-6 are schematic diagrams illustrating a mood detector 200 according to embodiments. As in FIG. 2, the mood detector 200 of FIGS. 3-6 is configured to associate metadata y with a multimedia file x. As in FIG. 2, the mood detector 200 in FIGS. 3-6 comprises a mood detection module 210 and a mood classification module 220. The mood detection module 210 comprises an identifier module 310 and/or a feature extractor module 320a. The identifier module 310 is configured to detect presence of mood indicator 140a, 140b, 140c in the multimedia file x. The mood classification module 220 comprises any number N≥1 of feature extractor modules 320a, 320b, . . . , 320N and a classifier module 330.

Each feature extractor module 320a, 320b, . . . , 320N is configured to extract one type of feature (such as text features, audio features, or video features) in the multimedia file x at points in time defined by the mood indicator 140a, 140b, 140c. A text feature extractor module could be configured to analyze a text transcript of a text part 110 of the multimedia file x. An audio feature extractor module could be configured to extract audio events, e.g., defined by shouting, intense music, whispering, crying sounds, unusual timbre of voices, etc. in the audio part 120 of the multimedia file x. The audio feature extractor module could thus be configured to have a music track as input and extracts music features such as key, intensity, timbre and rhythm. Generally, music pieces in major keys are consistently associated with positive emotions, whereas music pieces in minor keys are associated with negative emotions. From the speech track of the multimedia file x the timbre, pitch, speaking rate, and other features can be extracted. A video feature extractor module could be configured to extract lighting, movement, and/or ratio of scene change from an image track of a video part 130 of the multimedia file x. The input sequences to the feature extraction modules 320a, 320b, . . . , 320N are time sequences derived from the multimedia file x (typically the text, audio, and video streams) and some of these feature extraction modules 320a, 320b, . . . , 320N could have the exact same input time sequence.

The feature extraction modules 320a, 320b, . . . , 320N in the mood classification module 220 are only active if the mood detection module 210 indicates presence of a segment 150a, 150b, 150c comprising mood indicators 140a, 140b, 140c. The mood indicator 140a, 140b, 140c and features as extracted by the feature extractor modules 320a, 320b, . . . , 320N are used as input to the classifier module 330. The classifier module 330 is configured to determine a mood descriptive value and to associate the mood descriptive value with the multimedia file 100, x as metadata y.

Figure 3:
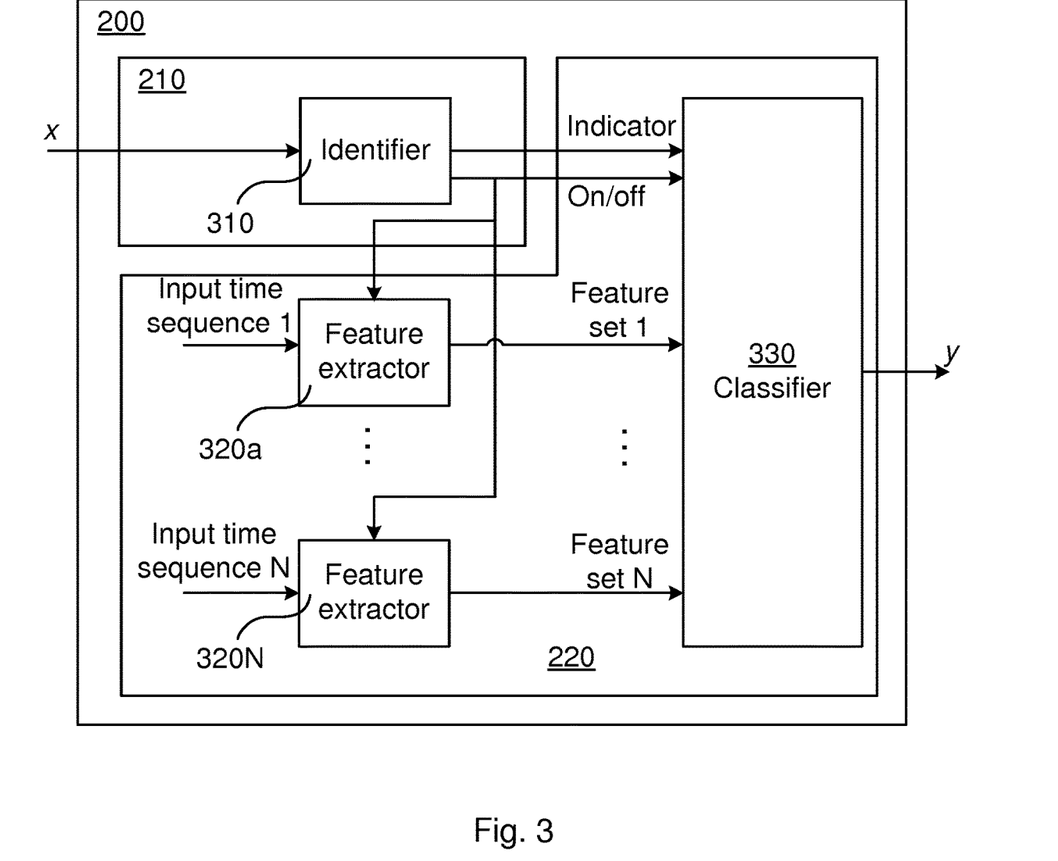

The embodiment of FIG. 3 represents scenarios where mood indicators 140a, 140b, 140c are readily available to the identifier module 310; i.e., scenarios where the mood detection module 210 does not need to perform any feature extraction in order to determine the mood indicators 140a, 140b, 140c.

Figure 4:
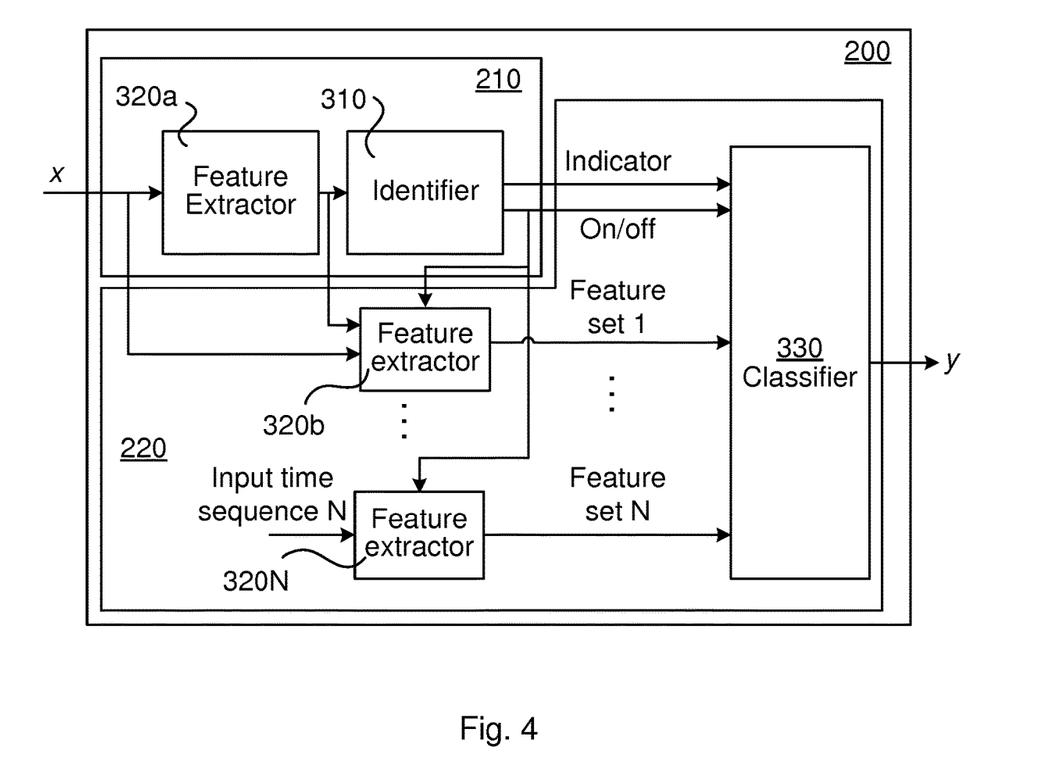

In comparison to the embodiment of FIG. 3, the embodiment of FIG. 4 represents scenarios where mood indicators 140a, 140b, 140c are not readily available to the identifier module 310; i.e., scenarios where the mood detection module 210 needs to perform feature extraction (by feature extractor module 320a) in order to determine the mood indicators 140a, 140b, 140c. The embodiment of FIG. 4 can thus represent a scenario where no text transcript of the media content of the multimedia file x is available. The feature extraction performed by feature extractor module 320a can include keyword and/or audio event spotting. The features derived by the feature extractor module 320a can constitute a subset of an audio feature set.

Figure 5:
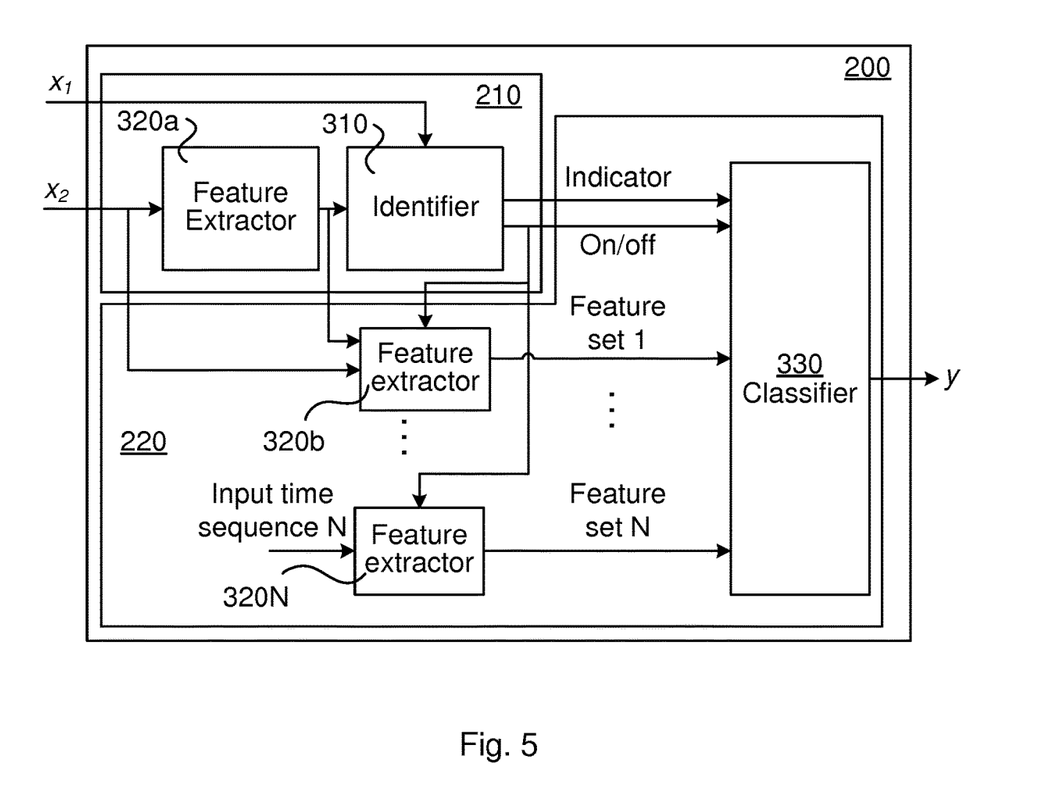

In the embodiment of FIG. 5 the multimedia file x comprises a first part $x_1$ and a second part $x_2$. The first part $x_1$ could be a text part 110 and the second part $x_2$ could be an audio part 120 of the multimedia file x. In comparison to the embodiments of FIGS. 3 and 4, the embodiment of FIG. 5 represents scenarios where mood indicators 140a, 140b, 140c are readily available to the identifier module 310 by means of the first part $x_1$ but where the mood detection module 210 still performs feature extraction (by feature extractor module 320a) on the second part $x_2$ in order to determine the mood indicators 140a, 140b, 140c. The embodiment of FIG. 4 can thus represent a scenario where a text transcript of the media content of the multimedia file x is available but where it is still desired to use additional features, such as audio features in order to detect presence of the mood indicators 140a, 140b, 140c.

Figure 6:
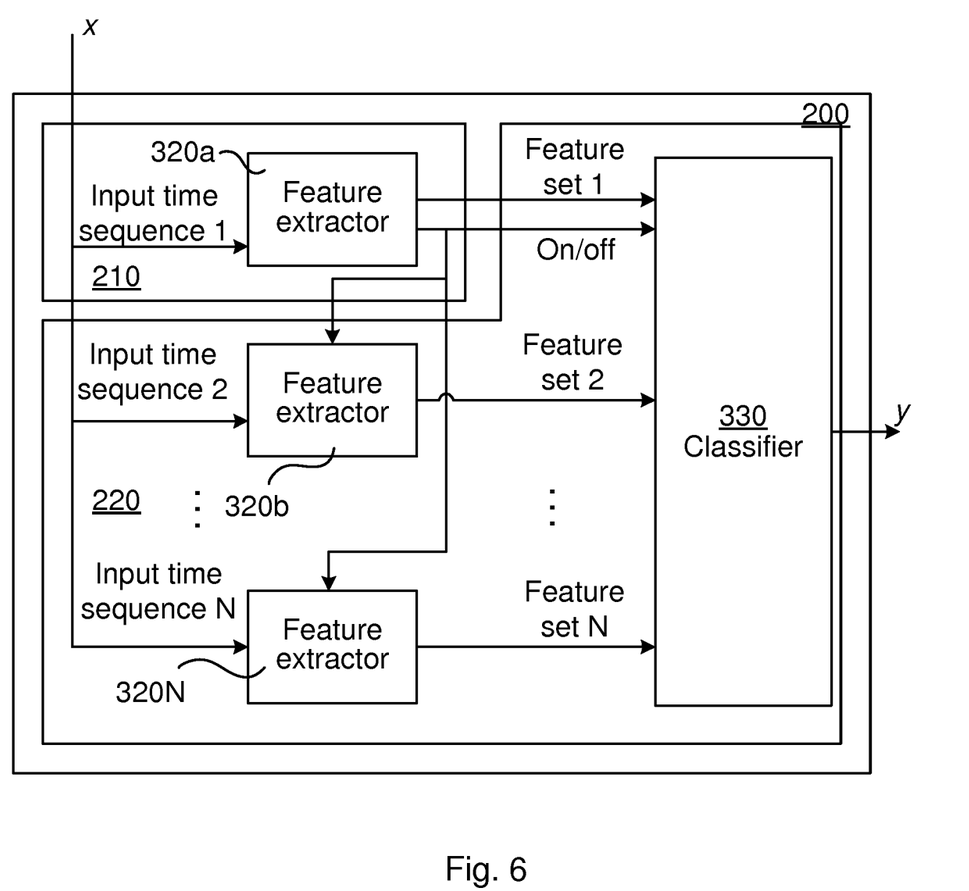

In comparison to the embodiments of FIGS. 3, 4 and 5, the embodiment of FIG. 6 represents scenarios where mood indicators 140a, 140b, 140c are not readily available to the identifier module 310; i.e., scenarios where the mood detection module 210 needs to perform feature extraction (by feature extractor module 320a) in order to determine the mood indicators 140a, 140b, 140c, and where the feature set determined by the feature extractor module 320a of the mood detection module 210 defines the mood indicators 140a, 140b, 140c.

The embodiments disclosed herein relate to associating metadata y with a multimedia file 100, x. In order to obtain this there is provided a mood detector 200, a method performed by the mood detector 200, a computer program product comprising code, for example in the form of a computer program, that when run on the mood detector 200, causes the mood detector 200 to perform the method.

Figures 7, 9, 10, 11:
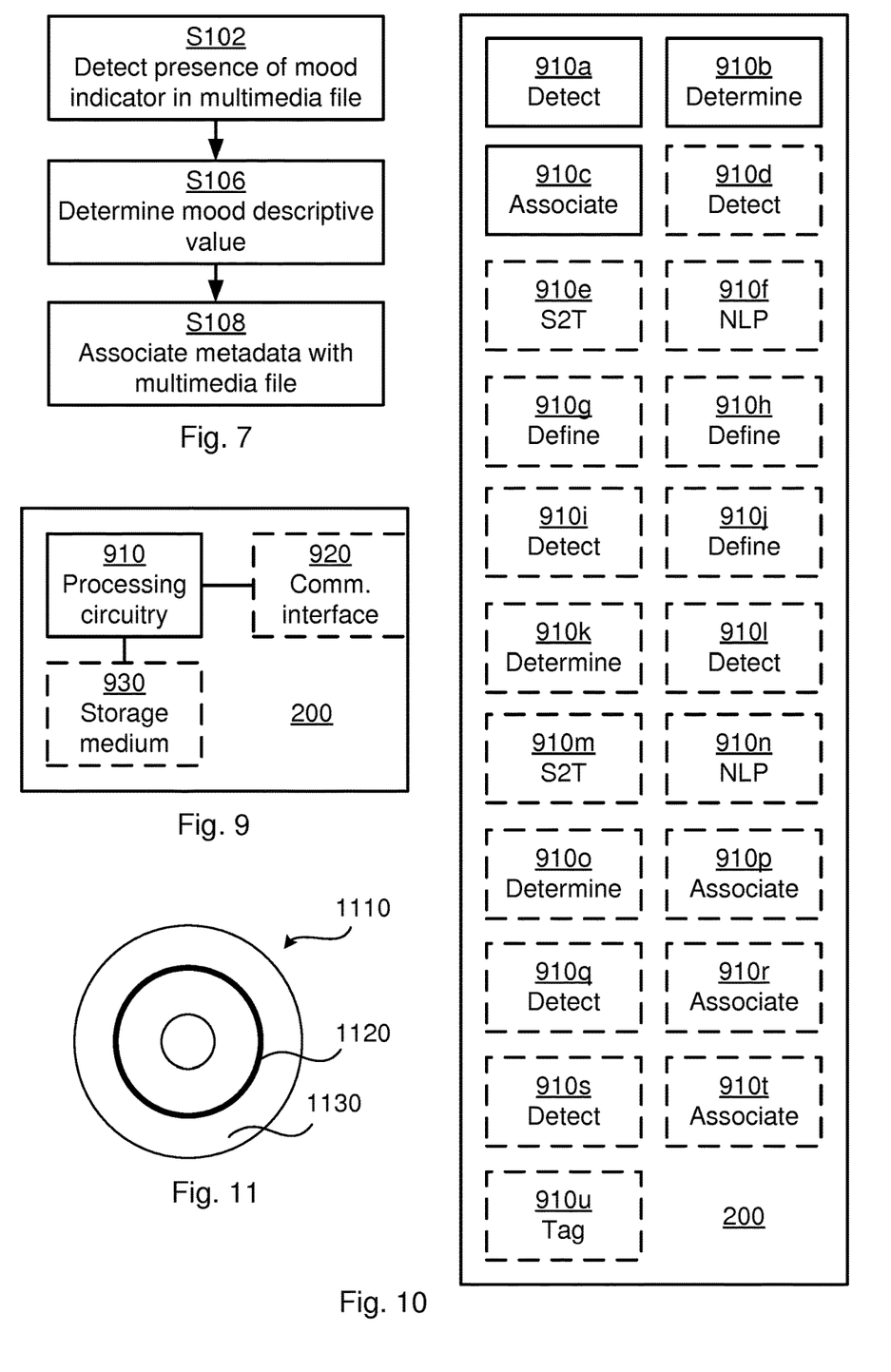
FIGS. 7 and 8 are flowcharts of methods according to embodiments.
FIG. 9 is a schematic diagram showing functional units of a mood detector according to an embodiment.
FIG. 10 is a schematic diagram showing functional modules of a mood detector according to an embodiment.
FIG. 11 shows one example of a computer program product comprising computer readable storage medium according to an embodiment.
Figure 8:
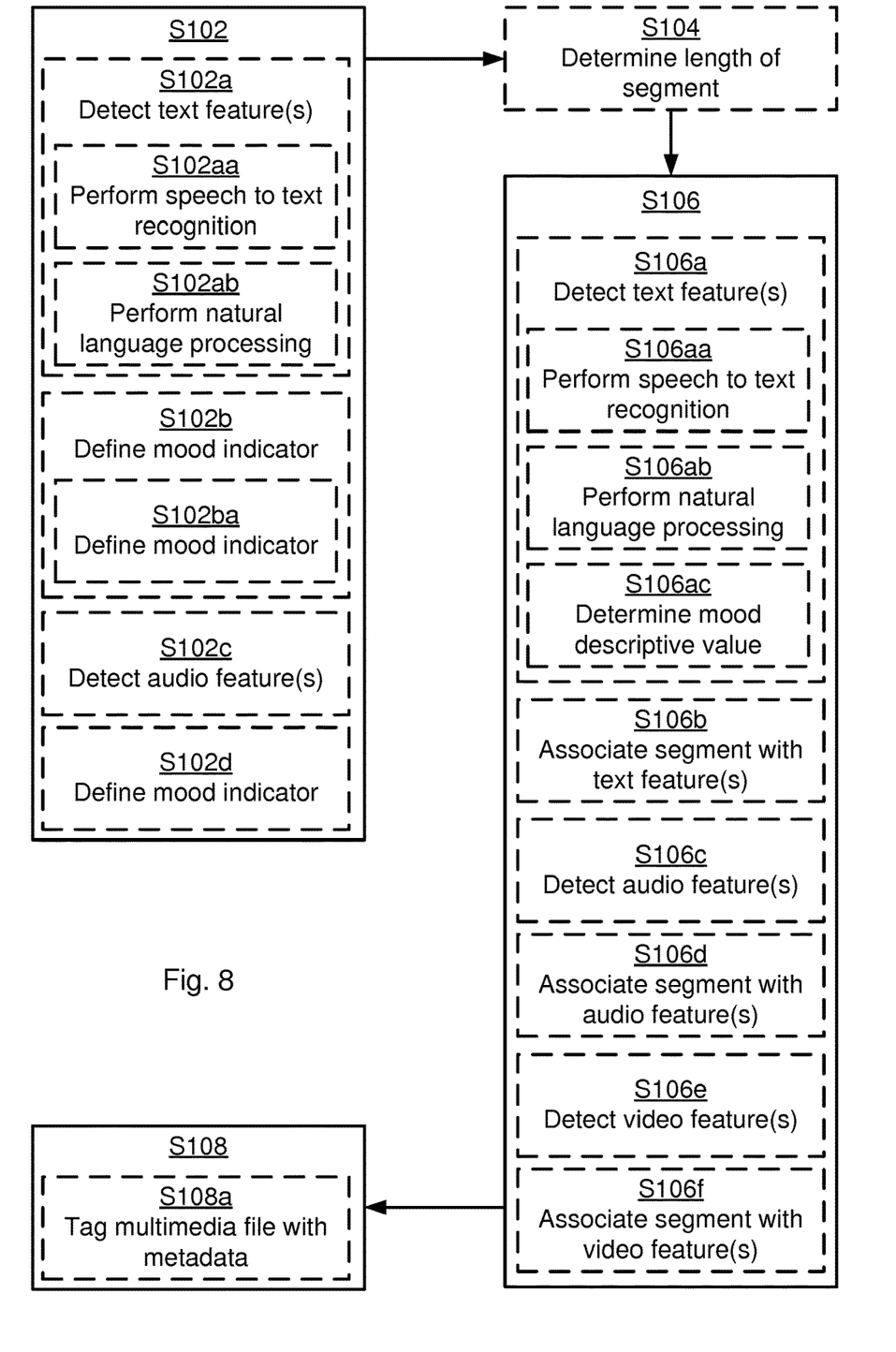

FIGS. 7 and 8 are flow charts illustrating embodiments of methods for associating metadata y with a multimedia file 100, x. The methods are performed by the mood detector 200. The methods are advantageously provided as computer programs 1120 (see, FIG. 11 below).

Reference is now made to FIG. 7 illustrating a method for associating metadata y with a multimedia file 100, x as performed by the mood detector 200 according to an embodiment.

S102: The mood detector 200 detects presence of a mood indicator 140a, 140b, 140c, 140d in the multimedia file 100, x. Presence of the mood indicator 140a, 140b, 140c, 140d is detected by the mood detection module 210 analysing the multimedia file 100, x. Embodiments relating to how the multimedia file 100, x can be analysed in step S102 will be disclosed below.

Detecting presence of the mood indicator 140a, 140b, 140c, 140d in the multimedia file 100, x by the mood detection module 210 acts as trigger to determine the mood descriptive value by the mood classification module 220. Hence, presence of the mood indicator 140a, 140b, 140c, 140d in the multimedia file 100, x as detected in step S102 triggers the mood detector 200 to perform step S106:

S106: The mood detector 200 determines a mood descriptive value. The mood descriptive value is determined by the mood classification module 220 analysing a segment 150a, 150b, 150c of the multimedia file 100, x. The segment 150a, 150b, 150c is defined by the mood indicator 140a, 140b, 140c, 140d. Embodiments relating to how the segment 150a, 150b, 150c of the multimedia file 100, x can be analysed in step S106 will be disclosed below.

Once the mood detector 200 has determined the mood descriptive value the mood descriptive value is associated with the multimedia file 100, x as metadata y in step S108:

S108: The mood detector 200 associates the mood descriptive value with the multimedia file 100, x as metadata y. In this respect, the metadata y thus represents the mood descriptive value and the mood indicator 140a, 140b, 140c, 140d can by the mood classification module 220 be used to derive the mood descriptive value. Hence, the mood indicator 140a, 140b, 140c, 140d does by itself not constitute the metadata y, nor does it need to be part of the metadata y.

The herein disclosed method for associating metadata y with a multimedia file 100, x enables efficient use of computational resources by activating the mood classification module 220 only for relevant parts of the multimedia file 100, x as defined by the mood indicator 140a, 140b, 140c, 140d detected by the mood detection module 210.

Further, activation based on mood indicators 140a, 140b, 140c, 140d such as keywords or key audio events can make the mood classification module 220 focus on the main emotional events occurring in the multimedia file 100, x.

This can help to have more relevant mood classification by refraining from analyzing irrelevant segments in the multimedia file 100, x by the mood classification module 220.

Embodiments relating to further details of associating metadata y with a multimedia file 100, x as performed by the mood detector 200 will now be disclosed.

There could be different ways to distinguish the mood detection module 210 and the mood classification module 220. One way is to relate the computational effort of the mood detection module 210 to the computational effort of the mood classification module 220. According to an embodiment the mood classification module 220 requires computational effort in addition to the mood detection module 210. According to a further embodiment the mood classification module 220 requires higher computational effort than the mood detection module 210.

There could be different ways to define the computational effort. For example, the computational effort could relate to number of computational operations. According to an embodiment the computational effort of the mood detection module 210 is defined as number of computational operations needed to be performed by the mood detection module 210 to detect presence of the mood indicator 140a, 140b, 140c, 140d in the multimedia file 100, x. According to an embodiment the computational effort of the mood classification module 220 is defined as number of computational operations needed to be performed by the mood classification module 220 to determine the mood descriptive value. Hence, the computational effort of the mood detection module 210 can be defined as the number of computational operations needed for step S102 to be performed and the computational effort of the mood classification module 220 can be defined as the number of computational operations needed for step S106 to be performed.

The number of computational operations could be determined in terms of floating-point operations per second, processing time, and/or memory requirements.

There could be different examples of metadata y. According to an embodiment the mood indicator 140a, 140b, 140c, 140d itself is provided as metadata, and the mood descriptive value represents enhanced metadata y.

There could be different examples of providing the metadata y. According to an embodiment the metadata y comprises the mood descriptive value and information of a time segment 150a, 150b, 150c in the multimedia file 100, x over which time segment 150a, 150b, 150c the mood descriptive value holds. The output from the mood classification module 220 can thus be a sequence of mood-classifications, where each mood-classification contains a mood descriptive value and the time segment 150a, 150b, 150c over which it holds.

Reference is now made to FIG. 8 illustrating methods for associating metadata y with a multimedia file 100, x as performed by the mood detector 200 according to further embodiments. It is assumed that steps S102-S108 are performed as disclosed with reference to the description of FIG. 7 and description thereof is therefore omitted.

Embodiments relating to further details of detecting presence of the mood indicator 140a, 140b, 140c, 140d in the multimedia file 100, x as in step S102 will now be disclosed.

In general terms the mood detection module 210 is always active and identifies points in time in the multimedia file 100, x where emotions are expected to be expressed, as defined by the detected mood indicators 140a, 140b, 140c, 140d.

For example, the mood detector 200 could be configured to perform text analysis and hence be configured to perform steps S102a, S102b as part of analysing the multimedia file 100, x in step S102:

S102a: The mood detector 200 detects at least one text feature in the multimedia file 100, x by the mood detection module 210 performing text analysis of the multimedia file 100, x.

S102b: The mood detector 200 defines the mood indicator 140a, 140b, 140c, 140d as the at least one text feature.

There could be different examples of how the text features are made available to the mood detector 200.

For example, a text transcript of the spoken content of the multimedia file 100, x could be available, for example, when subtitles are available. The text transcript can be searched for keywords that are expected to represent emotions or express a mood at a very low computational cost. For the triggering of the classification of the mood indicator 140a, 140b, 140c, 140d as a mood descriptive value in step S106, the collected keywords represent the mood indicators 140a, 140b, 140c, 140d and need just be collected in a database with no further classification. That is, the collected keywords indicate that some mood or emotion is likely to be expressed, however, for the activation it is not necessary to identify the mood or emotion they are associated with.

According to a first example, the at least one text feature is thus provided in the text part 110, such as in a text transcript, of the multimedia file 100, x. One example of such a text part no is a subtitle file. Each of the at least one text feature could be defined by a keyword, where the keyword represents an event in the multimedia file 100, x.

For example, low-complex natural language processing constructs can be utilized to identify combinations of keywords.

According to a second example, the text features are thus made available from speech to text recognition. Thus, the mood detector 200 could be configured to perform steps S102aa, S102ab as part of performing text analysis of the multimedia file 100, x in step S102a:

S102aa: The mood detector 200 performs speech to text recognition on the audio part 120 of the segment 150a, 150b, 150c of the multimedia file 100, x to generate the text transcript.

S102ab: The mood detector 200 performs natural language processing of the text transcript to identify a combination of keywords.

In relation to steps S102aa and S102ab the mood detector 200 could be configured to perform step S102ba as part of defining the mood indicator 140a, 140b, 140c, 140d in step S102b:

S102ba: The mood detector 200 defines the mood indicator 140a, 140b, 140c, 140d according to the combination of keywords.

For example, the mood detector 200 could be configured to perform audio analysis and hence be configured to perform steps S102c, S102d as part of analysing the multimedia file 100, x in step S102:

S102c: The mood detector 200 detects at least one audio feature in the multimedia file 100, x by the mood detection module 210 performing audio analysis of the audio part 120 of the multimedia file 100, x.

S102d: The mood detector 200 defines the mood indicator 140a, 140b, 140c, 140d as the at least one audio feature.

Further, according to some aspects the mood detection module 210 is configured to detect presence of a plurality of mood indicators 140a, 140b, 140c, 140d in the multimedia file 100, x. These plurality of mood indicators 140a, 140b, 140c, 140d could be of the same type (such as all being text features or all being audio features) or of a combination of types (such as some being text features and some being audio features).

In general terms, the classification in step S106 is disabled when detection of presence of the mood indicator 140a, 140b, 140c, 140d in the multimedia file 100, x is performed in step S102. Hence, the mood classification module 220 is deactivated until activation is triggered by the mood detection module 210 detecting presence of the mood indicator 140a, 140b, 140c, 140d in the multimedia file 100, x.

In aspects where the mood detection module 210 is configured to detect presence of a plurality of mood indicators 140a, 140b, 140c, 140d in the multimedia file 100, x each mood indicator 140a, 140b, 140c, 140d could either define its own segment 150a, 150b, 150c of the multimedia file 100, x, or at least two of the mood indicators 140a, 140b, 140c, 140d could define a common segment 150a, 150b, 150c of the multimedia file 100, x. In the latter, the mood classification module 220 is configured to in turn analyse all defined segments 150a, 150b, 150c of the multimedia file 100, x.

In general terms, each segment 150a, 150b, 150c of the multimedia file 100, x has a length. There could be different ways to determine the length of the segments 150a, 150b, 150c. According to aspects the mood detection module 210 detects presence of a mood indicator 140a at time $t_1=T_A$. The mood classification module 220 analyses the multimedia file 100, x in a surrounding of $t_1=T_A$ in a time span defined by:

$$T_A-\tau_1 < t < T_A+\tau_2$$

Here, $\tau_1$ is the time looking backward from $T_A$ and $\tau_2$ is the time looking forward from $T_A$ at which mood indicator 140a was detected and hence at which point in time the mood classification module 220 was activated. The backward and forward looking times can be individual for the different feature extraction modules to account for different expected locality of the mood expression, e.g., background music might be expected to give a longer spread indication than the actual conversation or gestures in the video. Hence, according to an embodiment the mood detector 200 is configured to determine the length of the segments 150a, 150b, 150c by performing step S104:

S104: The mood detector 200 determines the length of the segment 150a, 150b, 150c in accordance with which type (e.g., text based, audio based, or video based) of mood indicator 140a, 140b, 140c, 140d has been detected.

According to the illustrative example of FIG. 1 the segment 150a has a length corresponding to a duration in time of $\tau_1+\tau_2$ and occurs between $t=T_A-\tau_1$ and $t=T_A+\tau_2$, the segment 150b has a length corresponding to a duration in time of $\tau_3+\tau_4$ and occurs between $t=T_B-\tau_3$ and $t=T_B+\tau_4$, and the segment 150c has a length corresponding to a duration in time of $\tau_5+\tau_6$ and occurs between $t=(T_C+T_D)/2-\tau_5$ and $t=(T_C+T_D)/2+\tau_6$.

Step S104 could be performed either by the mood detection module 210 or by the mood classification module 220.

Embodiments relating to further details of determining the mood descriptive value as in step S106 will now be disclosed.

In general terms, the mood classification module 220 determines the mood descriptive value by analysing the segments 150a, 150b, 150c defined by the mood indicator 140a, 140b, 140c, 140d.

According to an example, the mood detector 200 could be configured to perform text analysis and hence be configured to perform steps S106a, S106b as part of analysing the multimedia file 100, x in step S106:

S106a: The mood detector 200 detects at least one text feature in the segment 150a, 150b, 150c of the multimedia file 100, x by the mood classification module 220 performing text analysis of the segment 150a, 150b, 150c of the multimedia file 100, x.

S106b: The mood detector 200 associates the segment 150a, 150b, 150c with the at least one text feature.

According to some aspects the text features are made available from speech to text recognition. Thus, the mood detector 200 could be configured to perform steps S106aa, S106ab, S106ac as part of performing text analysis in the text part 110 of the multimedia file 100, x in step S106a:

S106aa: The mood detector 200 performs speech to text recognition on the audio part 120 of the segment 150a, 150b, 150c of the multimedia file 100, x to generate the text transcript.

S106ab: The mood detector 200 performs natural language processing of the text transcript to identify a combination of keywords.

S106ac: The mood detector 200 determines the mood descriptive value according to the combination of keywords.

For example, the mood detector 200 could be configured to perform audio analysis and hence be configured to perform steps S106c, S106d as part of analysing the multimedia file 100, x in step S106:

S106c: The mood detector 200 detects at least one audio feature in the segment 150a, 15013, 150c of the multimedia file 100, x by the mood classification module 220 performing audio analysis of the audio part 120 of the segment 150a, 15013, 150c of the multimedia file 100, x.

S106d: The mood detector 200 associates the segment 150a, 15013, 150c with the at least one audio feature.

For example, the mood detector 200 could be configured to perform image analysis and hence be configured to perform steps S106e, S106f as part of analysing the multimedia file 100, x in step S106:

S106e: The mood detector 200 detects at least one video feature in the segment 150a, 15013, 150c of the multimedia file 100, x by the mood classification module 220 performing image analysis of the video part 130 of the segment 150a, 150b, 150c of the multimedia file 100, x.

S106f: The mood detector 200 associates the segment 150a, 150b, 150c with the at least one video feature.

There can be different kinds of video features and hence different kinds of image analysis that is performed on the video part 130 of the segment 150a, 150b, 150c of the multimedia file 100, x. For example, the video feature could represent any of movement, change of lighting, rate of scene change, etc. in the video part 130 of the segment 150a, 150b, 150c of the multimedia file 100, x.

In general terms, for the classification performed in step S106 one or several modalities of the media content in the multimedia file 100, x can by the mood detector 200 be used to derive features and eventually detect or classify what mood the content represents. Thus, the mood detector 200 could be configured such that two or more different kinds of features of the multimedia file 100, x are analysed and combined in step S106. For example, according to some aspects, analysing the multimedia file 100, x by the mood classification module 220 involves performing audio analysis of the audio part 120 of the segment 150a, 15013, 150c and performing image analysis of the video part 130 of the segment 150a, 15013, 150c. Analysing the multimedia file 100, x by the mood classification module 220 could additionally involve performing text analysis of the segment

150$a$, 15013, 150$c$ of the multimedia file 100, x. Hence, according to an embodiment step S106 involves all steps S106$a$, S106$c$, and S106$e$ to be performed. While the utilization of a multitude of modalities, e.g., text, audio, and video, increases the reliability of the classification it can also increase the complexity of the classification performed in step S106.

Embodiments relating to further details of associating the mood descriptive value with the multimedia file 100, x as metadata y as in step S108 will now be disclosed.

According to aspect the metadata y is provided as a tag to the multimedia file 100, x. Hence, according to an embodiment the mood detector 200 is configured to perform step S108$a$ as part of step S108:

S108$a$: The mood detector 200 tags the multimedia file 100, x with the metadata y.

FIG. 9 schematically illustrates, in terms of a number of functional units, the components of a mood detector 200 according to an embodiment. Processing circuitry 910 is provided using any combination of one or more of a suitable central processing unit (CPU), multiprocessor, microcontroller, digital signal processor (DSP), etc., capable of executing software instructions stored in a computer program product 1110 (as in FIG. 11), e.g. in the form of a storage medium 930. The processing circuitry 910 may further be provided as at least one application specific integrated circuit (ASIC), or field programmable gate array (FPGA).

Particularly, the processing circuitry 910 is configured to cause the mood detector 200 to perform a set of operations, or steps, S102-S108, as disclosed above. For example, the storage medium 930 may store the set of operations, and the processing circuitry 910 may be configured to retrieve the set of operations from the storage medium 930 to cause the mood detector 200 to perform the set of operations. The set of operations may be provided as a set of executable instructions.

Thus the processing circuitry 910 is thereby arranged to execute methods as herein disclosed. The storage medium 930 may also comprise persistent storage, which, for example, can be any single one or combination of magnetic memory, optical memory, solid state memory or even remotely mounted memory. The mood detector 200 may further comprise a communications interface 920 for obtaining the multimedia file 100, x and to provide the metadata y. As such the communications interface 920 may comprise one or more transmitters and receivers, comprising analogue and digital components. The processing circuitry 910 controls the general operation of the mood detector 200 e.g. by sending data and control signals to the communications interface 920 and the storage medium 930, by receiving data and reports from the communications interface 920, and by retrieving data and instructions from the storage medium 930. Other components, as well as the related functionality, of the mood detector 200 are omitted in order not to obscure the concepts presented herein.

FIG. 10 schematically illustrates, in terms of a number of functional modules, the components of a mood detector 200 according to an embodiment. The mood detector 200 of FIG. 10 comprises a number of functional modules; a detect module 910$a$ configured to perform step S102, a determine module 910$b$ configured to perform step S106, and an associate module 910$c$ configured to perform step S108. The mood detector 200 of FIG. 10 may further comprise a number of optional functional modules, such as any of a detect module 910$d$ configured to perform step S102$a$, a speech to text (S2T) module 910$e$ configured to perform step S102$aa$, a natural language processing (NLP) module 910$f$ configured to perform step S102$ab$, a define module 910$g$ configured to perform step S102$b$, a define module 910$h$ configured to perform step S102$ba$, a detect module 910$i$ configured to perform step S102$c$, a define module 910$j$ configured to perform step S102$d$, a determine module 910$k$ configured to perform step S104, a detect module 910$l$ configured to perform step S106$a$, a speech to text (S2T) module 910$m$ configured to perform step S106$aa$, a natural language processing (NLP) module ion configured to perform step S106$ab$, a determine module 9100 configured to perform step S106$ac$, an associate module 910$p$ configured to perform step S106$b$, a detect module 910$q$ configured to perform step S106$c$, an associate module 910$r$ configured to perform step S106$d$, a detect module 910$s$ configured to perform step S106$e$, an associate module 910$t$ configured to perform step S106$f$, and a tag module 910$u$ configured to perform step S108$a$.

In general terms, each functional module 910$a$-910$u$ may in one embodiment be implemented only in hardware or and in another embodiment with the help of software, i.e., the latter embodiment having computer program instructions stored on the storage medium 930 which when run on the processing circuitry 910 makes the mood detector 200 perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 910$a$-910$u$ may be implemented by the processing circuitry 910, possibly in cooperation with functional units 920 and/or 930. The processing circuitry 910 may thus be configured to from the storage medium 930 fetch instructions as provided by a functional module 910$a$-910$u$ and to execute these instructions, thereby performing any steps as disclosed herein.

The mood detector 200 may be provided as a standalone device or as a part of at least one further device. Alternatively, functionality of the mood detector 200 may be distributed between at least two devices, or nodes. These at least two nodes, or devices, may either be part of the same network part or may be spread between at least two such network parts.

Thus, a first portion of the instructions performed by the mood detector 200 may be executed in a first device, and a second portion of the of the instructions performed by the mood detector 200 may be executed in a second device; the herein disclosed embodiments are not limited to any particular number of devices on which the instructions performed by the mood detector 200 may be executed. Hence, the methods according to the herein disclosed embodiments are suitable to be performed by a mood detector 200 residing in a cloud computational environment. Therefore, although a single processing circuitry 910 is illustrated in FIG. 9 the processing circuitry 910 may be distributed among a plurality of devices, or nodes. The same applies to the functional modules 910$a$-910$u$ of FIG. 10 and the computer program 1120 of FIG. 11 (see below).

FIG. 11 shows one example of a computer program product 1110 comprising computer readable storage medium 1130. On this computer readable storage medium 1130, a computer program 1120 can be stored, which computer program 1120 can cause the processing circuitry 910 and thereto operatively coupled entities and devices, such as the communications interface 920 and the storage medium 930, to execute methods according to embodiments described herein. The computer program 1120 and/or computer program product 1110 may thus provide means for performing any steps as herein disclosed.

In the example of FIG. 1i, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for associating metadata with a multimedia file, the method being performed by a mood detector, the method comprising:
    detecting presence of a mood indicator in the multimedia file by using a mood detection module to analyze the multimedia file;
    determining a mood descriptive value by using a mood classification module to analyze a segment of the multimedia file, the segment being defined by the mood indicator, wherein the segment of the multimedia file has a length, the method further comprising determining the length of the segment in accordance with which type of mood indicator has been detected; and
    associating the mood descriptive value with the multimedia file as metadata; and
    detecting presence of the mood indicator by the mood detection module acting as a trigger to determine the mood descriptive value by the mood classification module.

2. The method according to claim 1, wherein the mood detection module detects presence of a plurality of mood indicators in the multimedia file.

3. The method according to claim 2, wherein:
    one of:
        each mood indicator defines its own segment of the multimedia file; and
        at least two of the mood indicators define a common segment of the multimedia file; and
    wherein the mood classification module in turn analyses all defined segments of the multimedia file.

4. The method according to claim 1, wherein analyzing the multimedia file by the mood detection module comprises:
    detecting at least one text feature in the multimedia file by performing text analysis of the multimedia file; and
    defining the mood indicator as the at least one text feature.

5. The method according to claim 4, wherein the at least one text feature is provided in a text part of the multimedia file.

6. The method according to claim 4, wherein each at least one text feature is defined by a keyword, and wherein the keyword represents an event in the multimedia file.

7. The method according to claim 4, wherein performing text analysis of the multimedia file comprises:
    performing speech to text recognition on an audio part of the segment of the multimedia file to generate a text transcript; and
    performing natural language processing of the text transcript to identify a combination of keywords; and
    wherein defining the mood indicator comprises:
        defining the mood indicator according to the combination of keywords.

8. The method according to claim 1, wherein analyzing the multimedia file by the mood classification module comprises:
    detecting at least one text feature in the multimedia file by performing text analysis of the multimedia file; and
    associating the segment with the at least one text feature.

9. The method according to claim 8, wherein performing text analysis of the multimedia file comprises:
    performing speech to text recognition on an audio part of the segment of the multimedia file to generate a text transcript;
    performing natural language processing of the text transcript to identify a combination of keywords; and
    determining the mood descriptive value according to the combination of keywords.

10. The method according to claim 1, wherein analyzing the multimedia file by the mood detection module comprises:
    detecting at least one audio feature in the multimedia file by performing audio analysis of an audio part of the multimedia file; and
    defining the mood indicator as the at least one audio feature.

11. The method according to claim 1, wherein analyzing the multimedia file by the mood classification module comprises:
    detecting at least one audio feature in the segment of the multimedia file by performing audio analysis of an audio part of the segment of the multimedia file; and
    associating the segment with the at least one audio feature.

12. The method according to claim 1, wherein analyzing the multimedia file by the mood classification module comprises:
    detecting at least one video feature in the segment of the multimedia file by performing image analysis of a video part of the segment of the multimedia file; and
    associating the segment with the at least one video feature.

13. The method according to claim 12, wherein the at least one video feature represents at least one taken from the group consisting of movement, change of lighting, and rate of scene change in the video part of the segment of the multimedia file.

14. The method according to claim 1, wherein analyzing the multimedia file by the mood classification module involves performing audio analysis of an audio part of the segment and performing image analysis of a video part of the segment.

15. The method according to claim 1, wherein associating the metadata with the multimedia file comprises:
    tagging the multimedia file with the metadata.

16. The method according to claim 1, wherein the mood indicator itself is provided as metadata, and wherein the mood descriptive value represents enhanced metadata.

17. The method according to claim 1, wherein the metadata comprises the mood descriptive value and information of a time segment in the multimedia file over which time segment the mood descriptive value holds.

18. The method according to claim 1, wherein the mood classification module requires computational effort in addition to the mood detection module, wherein computational effort of the mood detection module is defined as number of computational operations needed to be performed by the mood detection module to detect presence of the mood indicator, and wherein computational effort of the mood classification module is defined as number of computational operations needed to be performed by the mood classification module to determine the mood descriptive value, the computational operations determined in terms of floating-point operations per second, processing time, and/or memory requirements.

19. The method according to claim 1, wherein the mood classification module requires higher computational effort than the mood detection module, wherein computational effort of the mood detection module is defined as number of computational operations needed to be performed by the mood detection module to detect presence of the mood indicator, and wherein computational effort of the mood classification module is defined as number of computational operations needed to be performed by the mood classification module to determine the mood descriptive value, the computational operations determined in terms of floating-point operations per second, processing time, and/or memory requirements.

20. A mood detector for associating metadata with a multimedia file, the mood detector comprising processing circuitry, the processing circuitry being configured to cause the mood detector to:
   detect presence of a mood indicator in the multimedia file by using a mood detection module to analyze the multimedia file;
   determine a mood descriptive value by using a mood classification module to analyze a segment of the multimedia file, wherein the segment of the multimedia file has a length, wherein the mood detector determines the length of the segment in accordance with which type of mood indicator has been detected; and
   associate the mood descriptive value with the multimedia file as metadata; and
   wherein detecting presence of the mood indicator by the mood detection module acting as a trigger to determine the mood descriptive value by the mood classification module.

21. A computer storage medium storing a computer program for associating metadata with a multimedia file, the computer program comprising computer code which, when run on processing circuitry of a mood detector, causes the mood detector to:
   detect presence of a mood indicator in the multimedia file by using a mood detection module to analyze the multimedia file;
   determine a mood descriptive value by using a mood classification module to analyze a segment of the multimedia file, wherein the segment being defined by the mood indicator, wherein the segment of the multimedia file has a length, the mood detector caused to determine the length of the segment in accordance with which type of mood indicator has been detected; and
   associate mood descriptive value with the multimedia file as metadata; and
   wherein detecting presence of the mood indicator by the mood detection module acting as a trigger to determine the mood descriptive value by the mood classification module.

\* \* \* \* \*